United States Patent
Kawai

(10) Patent No.: US 11,411,252 B2
(45) Date of Patent: Aug. 9, 2022

(54) LITHIUM ION SECONDARY BATTERY AND METHOD OF MANUFACTURING THE SAME

(71) Applicant: Murata Manufacturing Co., Ltd., Nagaokakyo (JP)

(72) Inventor: Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 377 days.

(21) Appl. No.: 16/830,994

(22) Filed: Mar. 26, 2020

(65) Prior Publication Data

US 2020/0251786 A1 Aug. 6, 2020

Related U.S. Application Data

(63) Continuation of application No. PCT/JP2018/040448, filed on Oct. 31, 2018.

(30) Foreign Application Priority Data

Dec. 11, 2017 (JP) .............................. JP2017-236842

(51) Int. Cl.
  *H01M 10/0585* (2010.01)
  *H01M 10/0525* (2010.01)
  *H01M 10/44* (2006.01)
  *H01M 50/124* (2021.01)

(52) U.S. Cl.
  CPC ... *H01M 10/0585* (2013.01); *H01M 10/0525* (2013.01); *H01M 10/446* (2013.01); *H01M 50/124* (2021.01)

(58) Field of Classification Search
  None
  See application file for complete search history.

(56) References Cited

U.S. PATENT DOCUMENTS

| | | |
|---|---|---|
| 9,088,050 B2 | 7/2015 | Ueda |
| 9,281,538 B2 | 3/2016 | Ueda |
| 2013/0177798 A1 | 7/2013 | Ueda |
| 2013/0260214 A1 | 8/2013 | Ueda |

FOREIGN PATENT DOCUMENTS

| | | |
|---|---|---|
| JP | 200193580 A | 4/2001 |
| JP | 2017107851 A | 6/2017 |
| WO | 2012140707 A | 10/2012 |
| WO | 2013001960 A1 | 1/2013 |
| WO | 2013031195 A1 | 3/2013 |
| WO | 2017209052 A1 | 12/2017 |

OTHER PUBLICATIONS

International Search Report Issued for PCT/JP2018/040448, dated Jan. 29, 2019.
Written Opinion of the International Searching Authority issued for PCT/JP2018/040448, dated Jan. 29, 2019.

*Primary Examiner* — Sarah A. Slifka
(74) *Attorney, Agent, or Firm* — ArentFox Schiff LLP

(57) ABSTRACT

A lithium ion secondary battery that includes an electrode assembly having a plate-shaped positive electrode and a plate-shaped negative electrode stacked with a separator interposed therebetween, and an outer package made of a laminate film housing the electrode assembly. The lithium ion secondary battery has a polygonal shape having at least one set of a width and a length in a plan view thereof, and $C/(A \times B)$ is 0.50 ($N/mm^2$) to 1.20 ($N/mm^2$), where A is a thickness of the lithium ion secondary battery, B is a width of the lithium ion secondary battery, and C is a three-point bending strength of the lithium ion secondary battery.

19 Claims, 3 Drawing Sheets

LITHIUM ION SECONDARY BATTERY AND METHOD OF MANUFACTURING THE SAME

CROSS REFERENCE TO RELATED APPLICATIONS

The present application is a continuation of International application No. PCT/JP2018/040448, filed Oct. 31, 2018, which claims priority to Japanese Patent Application No. 2017-236842, filed Dec. 11, 2017, the entire contents of each of which are incorporated herein by reference.

FIELD OF THE INVENTION

The present invention relates to a lithium ion secondary battery and a method of manufacturing the same.

BACKGROUND OF THE INVENTION

As a conventional lithium ion secondary battery, those in which an electrode assembly including a positive electrode and a negative electrode is housed and sealed in an outer package made of a hard container such as a metal can or an outer package made of a flexible laminate film are known. In recent years, as portable electronic devices such as mobile phones have become lighter and smaller, the use of an outer package made of a laminate film has been studied for lithium ion secondary batteries mounted on the portable electronic devices from the viewpoint of a reduction in thickness.

For example, as a portable electronic device, for example, regarding a living body-attached biological information measurement device, Patent Document 1 (WO 2012/140707 A) proposes using a lithium ion secondary battery in which a sheet-shaped electrode assembly is housed in an outer package made of a laminate film as a driving power source.

SUMMARY OF THE INVENTION

As the electrode assembly, a wound-type electrode assembly in which a long positive electrode and a long negative electrode are wound with a separator interposed therebetween, and a sheet-shaped electrode assembly, i.e., a stack-type electrode assembly in which a plate-shaped positive electrode and a plate-shaped negative electrode are stacked in a plane with a separator interposed therebetween have been known. The use of the wound-type electrode assembly is characterized in that, as the long positive electrode and the long negative electrode are wound, a binding force is applied to the entire electrode assembly, and the battery reaction between the positive electrode and the negative electrode occurs uniformly, so that the cycle characteristics are excellent. On the other hand, the use of the stack-type electrode assembly has a problem that the battery reaction between the positive electrode and the negative electrode is not uniform and the cycle characteristics are reduced because a binding force is not applied to the electrode body unlike the wound type.

Moreover, in a lithium ion secondary battery including an outer package made of a metal can, a binding force is applied to the entire electrode assembly by the metal can, and the battery reaction between the positive electrode and the negative electrode occurs uniformly, so that the cycle characteristics are excellent. On the other hand, in a lithium ion secondary battery including an outer package made of a laminate film, because the binding force equal to or more than the atmospheric pressure is not applied to the electrode assembly, there is a problem that the battery reaction between the positive electrode and the negative electrode becomes non-uniform and the cycle characteristics are reduced.

Therefore, in a lithium ion secondary battery in which a stack-type electrode assembly is housed in an outer package made of a laminate film, there is a problem that the cycle characteristics are reduced as compared to a case where the wound-type electrode assembly is housed in a metal can.

Therefore, it is an object of the present inventors to provide a lithium ion secondary battery in which a stack-type electrode assembly is housed in an outer package made of a laminate film, which has excellent cycle characteristics, and a method of manufacturing the same.

In order to solve the above problem, a lithium ion secondary battery according to an aspect of the present invention includes an electrode assembly having a plate-shaped positive electrode and a plate-shaped negative electrode stacked with a separator interposed therebetween; and an outer package made of a laminate film housing the electrode assembly. The lithium ion secondary battery has a polygonal shape having at least one set of a width and a length in a plan view thereof, and $C/(A \times B)$ is 0.50 (N/mm$^2$) to 1.20 (N/mm$^2$), where A is a thickness of the lithium ion secondary battery, B is a width of the lithium ion secondary battery, and C is a three-point bending strength of the lithium ion secondary battery.

According to the above, it is possible to provide a lithium ion secondary battery in which a stack-type electrode assembly housed in an outer package made of a laminate film has excellent cycle characteristics. Also, the present invention makes it possible to increase the degree of freedom of designing a portable electronic device on which the lithium ion secondary battery is mounted.

Further, according to another aspect of the present invention, the lithium ion secondary battery has a rectangular shape in a plan view.

Further, according to another aspect of the present invention, the lithium ion secondary battery has an L-shape in a plan view.

Further, according to another aspect of the present invention, the separator has an adhesive layer at least on one surface.

Further, according to another aspect of the present invention, the A is 0.45 mm or more.

Further, another aspect of the present invention is a method of manufacturing the lithium ion secondary battery according to the aspect, the method comprising: a step of producing an electrode assembly having a plate-shaped positive electrode and a plate-shaped negative electrode stacked with a separator interposed therebetween; a step of housing the electrode assembly in an outer package made of a laminate film; an injection step of injecting an electrolyte into the outer package housing the electrode assembly; a sealing step of sealing the outer package under reduced pressure into which the electrolyte has been injected; a heat pressing step of heat-pressing the sealed outer package at 60° C. or higher and lower than 100° C.; and an initial charge step of initial charge at a temperature of 25° C. or higher and lower than 100° C.

According to the manufacture method, it is possible to provide a lithium ion secondary battery in which a stack-type electrode assembly is housed in an outer package made of a laminate film and which has excellent cycle characteristics.

Further, the separator preferably has an adhesive layer at least on one surface.

Further, the electrolyte is preferably injected such that the amount per battery capacitance is 1.3 to 1.7 g/Ah.

According to the present invention, it is possible to provide a lithium ion secondary battery in which a stack-type electrode assembly is housed in an outer package made of a laminate film and which has excellent cycle characteristics.

DETAILED DESCRIPTION OF THE INVENTION

An embodiment of the present invention will be described in detail below with reference to the drawings and the like.

(Lithium Ion Secondary Battery)

A lithium ion secondary battery according to an aspect of the present invention includes an electrode assembly having a plate-shaped positive electrode and a plate-shaped negative electrode stacked with a separator interposed therebetween and which is housed in an outer package made of a laminate film, wherein the lithium ion secondary battery has a polygonal shape having at least one set of width and length in a plan view, and when the thickness of the lithium ion secondary battery is A (mm), and the width is B (mm), and the three-point bending strength of the lithium ion secondary battery is C(N), C/(A×B) is 0.50 (N/mm$^2$) to 1.20 (N/mm$^2$).

The electrode assembly according to the present invention includes a plate-shaped positive electrode and a plate-shaped negative electrode stacked with a separator interposed therebetween. The positive electrode/separator/negative electrode is an electrode unit, and the electrode assembly includes one or more electrode units. A plurality of the electrode units are stacked such that the positive electrode and the negative electrode are alternately arranged with the separator interposed therebetween. Further, as an example including a plurality of electrode units, a structure of positive electrode/separator/negative electrode/separator/positive electrode or negative electrode/separator/positive electrode/separator/negative electrode in which electrodes having the same polarity are arranged on both sides may be used. In this case, a double-sided negative electrode and a double-sided positive electrode, which will be described later, can be used as the intermediate negative electrode and the intermediate positive electrode, respectively. Note that the plate-shaped positive electrode and the plate-shaped negative electrode in the present invention are electrodes that extend on a plane and do not include an electrode that extends on a curved surface such as the wound type.

Further, the electrode assembly of the present invention includes those in which a separator is interposed between a plate-shaped positive electrode and a plate-shaped negative electrode, and includes, for example, the electrode assembly in which the separator of each electrode unit is not continuous with the separator of another electrode unit, and also where the separator is arranged to partially wrap around or meander between a plurality of electrode units.

Figure 1:
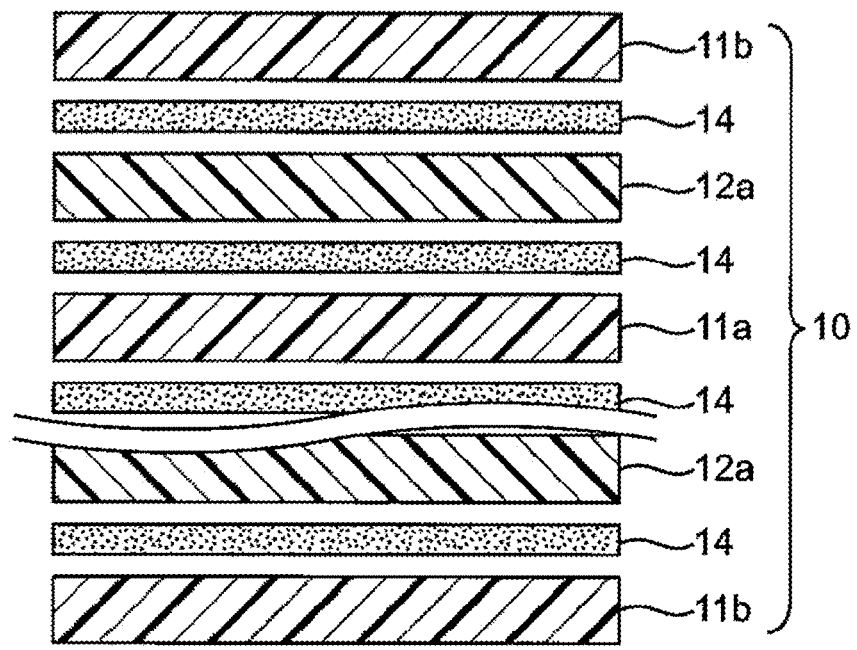
FIG. 1 is a schematic cross-sectional view illustrating an example of a configuration of an electrode assembly used for a lithium ion secondary battery of the present invention.

FIG. 1 is a schematic sectional view illustrating an example of the structure of the electrode assembly. An electrode assembly 10 includes a single-sided positive electrode 11b at the uppermost layer and the lowermost layer, and a double-sided negative electrode 12a and a double-sided positive electrode 11a are stacked between the uppermost layer and the lowermost layer with a separator 14 interposed therebetween.

Further, in the present invention, the lithium ion secondary battery has a polygonal shape having at least one set of a width and a length in a plan view. Various polygonal shapes can be used depending on the shape and size of the place where the lithium ion secondary battery is mounted. Here, the polygonal shape is a shape surrounded by four or more sides. Examples of the polygonal shape having one set of a width and a length include a rectangle such as a square, an oblong, and a rhombus. Further, examples of the polygonal shape having a plurality of sets of widths and lengths include a pentagon, a hexagon, and a shape obtained by combining a plurality of rectangles. Examples of the shape obtained by combining a plurality of rectangles include an L shape, a U shape, a square shape, a T shape, an H shape, and a cross shape. Note that, in the case of a square or a rhombus, because the width and the length are the same size, any value of the width or the length may be used.

Further, in the present invention, when the thickness of the lithium ion secondary battery is A (mm), the width is B (mm), and the three-point bending strength of the lithium ion secondary battery is C(N), C/(A×B) is 0.50 (N/mm$^2$) to 1.20 (N/mm$^2$).

Three-point bending strength measurement is a test method in which a test piece having an oblong cross-sectional shape is placed on two support bases and a force is applied to the middle of the test piece with an indenter to bend the middle between the starting points at a constant speed until the test piece reaches a predetermined maximum strain or the outer surface of the test piece is broken. The force applied to the test piece and the bending (displacement amount) during the test are measured. In the present invention, measurement can be performed on the basis of JIS K7171: 2016 (plastics-determination of flexural properties).

Figure 2:
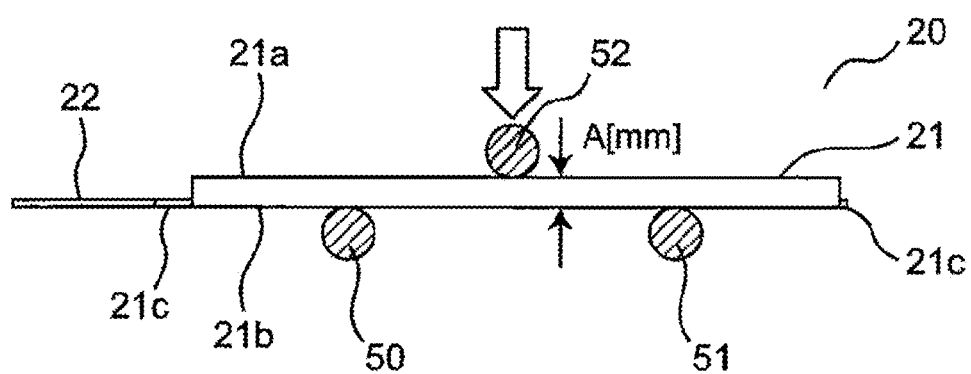
FIG. 2 is a schematic side view illustrating an example of a method for measuring three-point bending strength according to the present invention.
Figure 3:
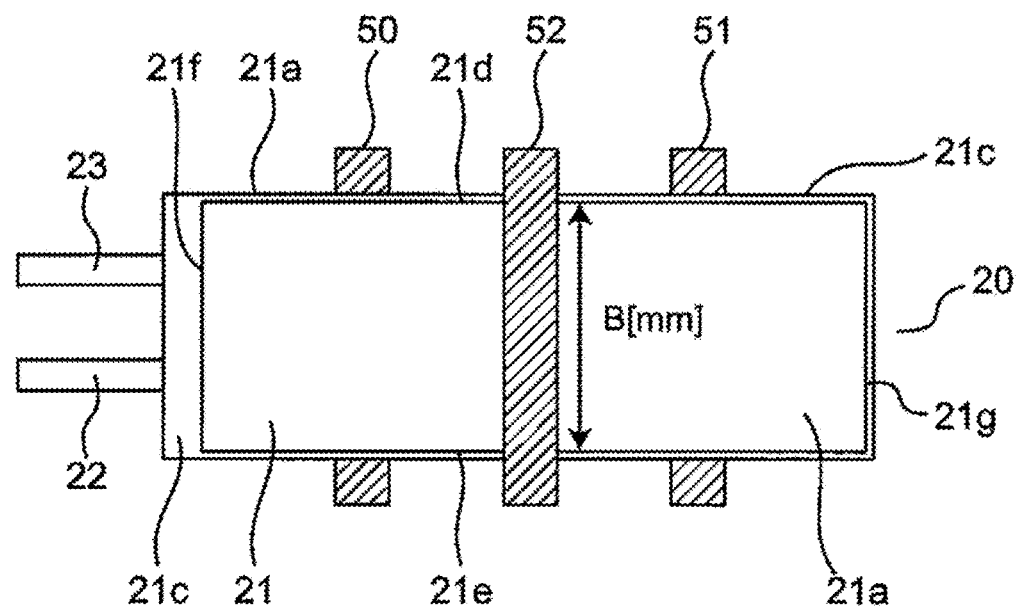
FIG. 3 is a schematic plan view illustrating an example of a method for measuring a three-point bending strength according to the present invention.

FIGS. 2 and 3 are schematic views illustrating an example of the three-point bending strength measurement method, and are a side view and a plan view illustrating a state where a lithium ion secondary battery is set in a jig for a three-point bending strength test device. In this example, a lithium ion secondary battery 20 has an oblong shape having a set of a width and a length in a plan view. The lithium ion secondary battery 20 has an outer package 21 in which an electrode assembly having an oblong shape (not illustrated) and an electrolyte (not illustrated) are sealed, and external terminals 22 and 23 led out from the outer package 21. In addition, a sealing portion 21c is formed at a peripheral portion of the outer package 21, and has a step between a top surface 21a and a bottom surface 21b of the outer package 21. The bottom surface 21b of the outer package 21 is placed on two support bases 50 and 51 of a test device (not illustrated), and a force is applied to the top surface 21a by an indenter 52. Further, the thickness A (mm) of the lithium ion secondary battery 20 is a distance between the top surface 21a and the bottom surface 21b of the outer package 21, and, for example, the value of the thickness of the middle of the lithium ion secondary battery 20 can be used. Here, the width B (mm) of the lithium ion secondary battery 20 is the width of the top surface 21a of the outer package 21, which is the distance between opposite long side 21d and long side 21e of the top surface 21a of the outer package 21 in FIG. 3. Further, the distance between opposite short side 21f and short side 21g of the top surface 21a of the outer package 21 corresponds to the length of the lithium ion secondary battery 20. Note that in the case where the lithium ion secondary battery has a square shape in a plan view, it is the distance between a pair of opposite sides.

Figure 4:
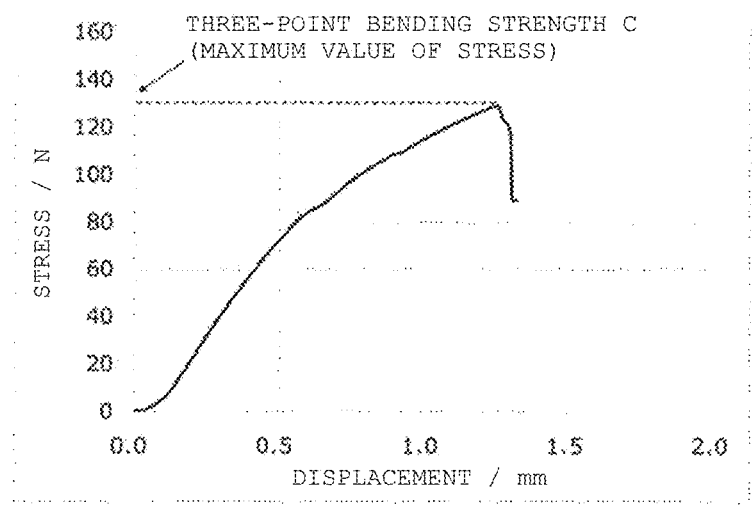
FIG. 4 is a graph illustrating a measurement example of three-point bending strength according to the present invention.

FIG. 4 is a graph illustrating an example of a result of measurement of three-point bending strength, indicating the relationship between displacement and stress. In the present invention, the maximum value of the stress, i.e., the stress at the time when the test piece is broken is used as the three-point bending strength C(N) of the lithium ion secondary battery.

In the present invention, the value of C/(A×B) is 0.50 (N/mm$^2$) to 1.20 (N/mm$^2$), preferably 0.60 (N/mm$^2$) to 1.10 (N/mm$^2$), more preferably 0.70 (N/mm$^2$) to 1.00 (N/mm$^2$). When the value of C/(A×B) is less than 0.50 (N/mm$^2$), the adhesion between the separator and the positive electrode and the negative electrode is insufficient, and the stack body is deformed due to charge and discharge. Therefore, the battery reaction between the positive electrode and the negative electrode becomes non-uniform and the cycle characteristics are reduced. Further, when the value of C/(A×B) is larger than 1.20 (N/mm$^2$), the adhesion between the separator and the positive electrode and the negative electrode is excessive, and diffusion of lithium ions in the electrolyte is prevented. Therefore, the battery reaction between the positive electrode and the negative electrode becomes non-uniform and the cycle characteristics are reduced.

Further, the thickness A (mm) of the lithium ion secondary battery, which is not particularly limited, is 0.45 mm or more, preferably 0.45 mm to 5.00 mm from the viewpoint of further improvement in cycle characteristics.

Further, the width B (mm) of the lithium ion secondary battery, which is not particularly limited, is 10 mm to 100 mm, preferably 15 mm to 60 mm from the viewpoint of a reduction in size.

Figure 5:
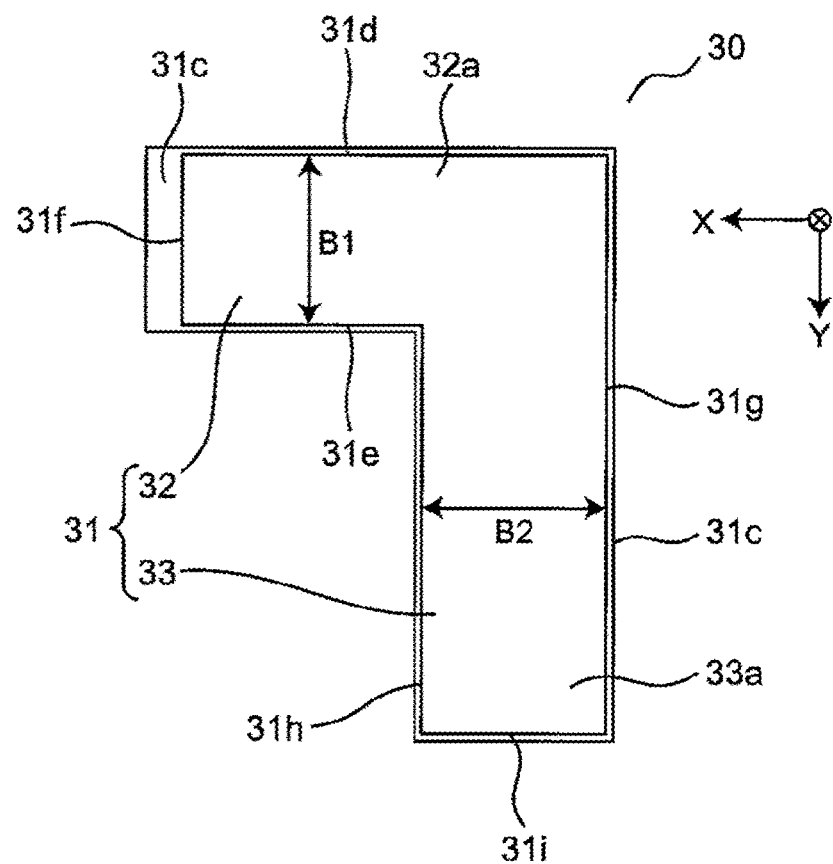
FIG. 5 is a schematic plan view illustrating an example of another configuration the lithium ion secondary battery of the present invention.

FIG. 5 is a schematic plan view illustrating another structure of the lithium ion secondary battery, illustrating an example having an L-shape having two sets of widths and lengths in a plan view. A lithium ion secondary battery 30 has an outer package 31 in which an electrode assembly having an L shape (not illustrated) and an electrolyte (not illustrated) are sealed, and external terminals (not illustrated). The outer package 31 has a first extension 32 extending in a first direction (for example, X direction) and a second extension 33 extending in a second direction (for example, Y direction) perpendicular to the first direction. The first extension 32 and the second extension 33 are connected by sharing a connection. In addition, a sealing portion 31c is formed at a peripheral portion of the outer package 31, and a step is provided between top surfaces 32a and 33a and a bottom surface (not illustrated) of the outer package 31. Here, the lithium ion secondary battery 30 has two sets of widths and lengths. Specifically, one set includes width B1 defined by the distance between opposite side 31d and side 31e and length defined by the distance between opposite side 31f and side 31g on the top surface 32a of the first extension 32. Further, the other set includes width B2 defined by the distance between opposite side 31g and side 31h and length defined by the distance between opposite side 31d and side 31i on the top surface 33a of the second extension 33. Even when it has two widths B1 and B2 as in this example, two values "C/(A×B1)" and " C/(A×B2)" calculated using the values of the widths B1 and B2 are both required to be 0.50 (N/mm$^2$) to 1.20 (N/mm$^2$). Furthermore, even in the case of having three or more sets of widths and lengths, similarly, the value of "C/(A×B)" calculated using the value of each width is required to be 0.50 (N/mm$^2$) to 1.20 (N/mm$^2$).

The positive electrode used in the present invention includes at least a positive electrode material layer and a positive electrode current collector. In the positive electrode, the positive electrode material layer is provided on at least one surface of the positive electrode current collector, and the positive electrode material layer contains a positive electrode active material as an electrode active material. For example, a plurality of positive electrodes in the electrode assembly may each have a positive electrode material layer provided on both surfaces of the positive electrode current collector, or may have a positive electrode material layer provided only on one surface of the positive electrode current collector. From the viewpoint of further increase in capacitance of the secondary battery, the positive electrode preferably has the positive electrode material layer provided on both surfaces of the positive electrode current collector.

The negative electrode used in the present invention includes at least a negative electrode material layer and a negative electrode current collector. In the negative electrode, the negative electrode material layer is provided on at least one surface of the negative electrode current collector, and the negative electrode material layer contains a negative electrode active material as an electrode active material. For example, a plurality of negative electrodes in the electrode assembly may each have a negative electrode material layer provided on both surfaces of the negative electrode current collector, or may have a negative electrode material layer provided only on one surface of the negative electrode current collector. From the viewpoint of further increase in capacitance of the secondary battery, the negative electrode preferably has the negative electrode material layer provided on both surfaces of the negative electrode current collector.

In the present invention, the electrode active materials contained in the positive electrode and the negative electrode, i.e., the positive electrode active material and the negative electrode active material are materials directly involved in transfer of electrons in the secondary battery, and is a main material of the positive and negative electrodes for charge and discharge, i.e., the battery reaction. More specifically, ions are brought into an electrolyte due to the "positive electrode active material contained in the positive electrode material layer" and the "negative electrode active material contained in the negative electrode material layer", and the ions are moved between the positive electrode and the negative electrode such that the electrons are transferred, resulting in charge and discharge. The positive electrode material layer and the negative electrode material layer are particularly preferably layers capable of storage and release of lithium ions. That is, it is preferable that the battery be a nonaqueous electrolyte secondary battery in which lithium ions move between the positive electrode and the negative electrode via the nonaqueous electrolyte to charge and discharge the battery. When lithium ions are involved in charge and discharge, the secondary battery obtained by the manufacture method of the present invention corresponds to a so-called lithium ion battery, and the positive electrode and the negative electrode have layers capable of storage and release of lithium ions.

The positive electrode active material of the positive electrode material layer is formed, for example, of a granular body, and it is preferable that a binder be contained in the positive electrode material layer for sufficient contact between grains and shape retention. Further, a conductive aid may be contained in the positive electrode material layer in order to facilitate the transfer of electrons for promoting the battery reaction. Similarly, the negative electrode active material of the negative electrode material layer is formed, for example, of a granular body, and it is preferable that a binder be contained for sufficient contact between grains and shape retention, and a conductive aid may be contained in the negative electrode material layer in order to facilitate the transfer of electrons for promoting the battery reaction. As described above, since the positive electrode material layer and the negative electrode material layer are in the form of including a plurality of components, the positive electrode material layer and the negative electrode material layer can also be referred to as a positive electrode mixture layer and a negative electrode mixture layer, respectively.

The positive electrode active material is preferably a material that contributes to storage and release of lithium ions. From this viewpoint, the positive electrode active material is preferably, for example, a lithium-containing composite oxide. More specifically, the positive electrode active material is preferably a lithium transition metal composite oxide containing lithium and at least one transition metal selected from the group consisting of cobalt, nickel, manganese, and iron. For example, the positive electrode active material may be lithium cobalt oxide, lithium nickel oxide, lithium manganese oxide, lithium iron phosphate, or those transition metals partially replaced with another metal. Such a positive electrode active material may be contained as a single type or as a combination of two or more types. For example, the positive electrode active material contained in the positive electrode material layer may be lithium cobalt oxide.

The binder that can be contained in the positive electrode material layer is not particularly limited, but can include at least one selected from the group consisting of polyvinylidene fluoride, vinylidene fluoride-hexafluoropropylene copolymer, vinylidene fluoride-tetrafluoroethylene copolymer, and polytetrafluoroethylene and the like. The conductive aid that can be contained in the positive electrode material layer is not particularly limited, but can include at least one selected from carbon black such as thermal black, furnace black, channel black, ketjen black, and acetylene black, graphite, carbon nanotube, carbon fibers such as vapor-grown carbon fiber, metal powders, e.g., of copper, nickel, aluminum, and silver, and polyphenylene derivatives. For example, the binder of the positive electrode material layer may be polyvinylidene fluoride, and the conductive aid of the positive electrode material layer may be carbon black. As a mere example, the binder and the conductive aid of the positive electrode material layer may be a combination of polyvinylidene fluoride and carbon black.

The negative electrode active material is preferably a material that contributes to storage and release of lithium ions. From this point of view, the negative electrode active material is preferably, for example, various carbon materials, oxides, or lithium alloys.

Examples of the various carbon materials of the negative electrode active material include graphite (natural graphite, artificial graphite), hard carbon, soft carbon, diamond-like carbon, and the like. In particular, graphite is preferable in that it has high electron conductivity and excellent adhesion to the negative electrode current collector. Examples of the oxide of the negative electrode active material include at least one selected from the group consisting of silicon oxide, tin oxide, indium oxide, zinc oxide, lithium oxide, and the like. The lithium alloy of the negative electrode active material may be any metal that can form an alloy with lithium, and may be a binary, ternary or higher alloy of lithium and metal, for example, Al, Si, Pb, Sn, In, Bi, Ag, Ba, Ca, Hg, Pd, Pt, Te, Zn, and La. Such an oxide is preferably amorphous in its structural form. This is because deterioration due to non-uniformity such as grain boundaries or defects is less likely to occur. Although it is a mere example, in the secondary battery obtained by the manufacture method of the present invention, the negative electrode active material of the negative electrode material layer may be artificial graphite.

The binder that can be contained in the negative electrode material layer is not particularly limited, but can be at least one selected from the group consisting of styrene butadiene rubber, polyacrylic acid, polyvinylidene fluoride, polyimide resin, and polyamideimide resin. For example, the binder contained in the negative electrode material layer may be styrene butadiene rubber. The conductive aid that can be contained in the negative electrode material layer is not particularly limited, but can include at least one selected from carbon black such as thermal black, furnace black, channel black, ketjen black, and acetylene black, graphite, carbon nanotube, carbon fibers such as vapor-grown carbon fiber, metal powders, e.g., of copper, nickel, aluminum, and silver, and polyphenylene derivatives. Note that the negative electrode material layer may contain a component derived from a thickener component (for example, carboxymethyl cellulose) used during battery manufacture.

For example, the negative electrode active material and the binder in the negative electrode material layer may be a combination of artificial graphite and styrene-butadiene rubber.

The positive electrode current collector and the negative electrode current collector used for the positive electrode and the negative electrode are members that contribute to collecting and supplying electrons generated in the active materials due to the battery reaction. Such a current collector may be a sheet-shaped metal member, and may have a perforated or bored form. For example, the current collector may be a metal foil, a punched metal, a net, an expanded metal, or the like. The positive electrode current collector used for the positive electrode is preferably made of a metal foil containing at least one selected from the group consisting of aluminum, stainless steel, nickel, and the like, and may be, for example, an aluminum foil. On the other hand, the negative electrode current collector used for the negative electrode is preferably made of a metal foil containing at least one selected from the group consisting of copper, stainless steel, nickel, and the like, and may be, for example, a copper foil.

The separator used for the positive electrode and the negative electrode is a member provided from the viewpoint of prevention of short circuit due to contact between the positive and negative electrodes and retention of the electrolyte. In other words, the separator can be said to be a member that passes ions while preventing electronic contact between the positive electrode and the negative electrode. Preferably, the separator is a porous or microporous insulating member and has a film form due to its small thickness.

For example, a microporous film made of polyolefin may be used. In this respect, the microporous film used as the separator may include, for example, only polyethylene (PE) or only polypropylene (PP) as the polyolefin. Furthermore, the separator may be a stack body including a "PE microporous film" and a "PP microporous film."

Further, the separator may have an adhesive layer in at least a part of both surfaces and/or one surface. The adhesive layer can improve the adhesion between the positive electrode and/or the negative electrode and the separator. Thus, the cycle characteristics can be further improved. The adhesive layer preferably contains an adhesive and inorganic grains. As the adhesive, a fluorine-based resin or an acrylic resin can be used, but a fluorine-based resin can be preferably used, and a vinylidene fluoride-based resin can be more preferably used. Examples of the vinylidene fluoride-based resin include polyvinylidene fluoride and a copolymer of vinylidene fluoride and hexafluoropropylene. Further, alumina grains or silica grains can be used as the inorganic grains. Preferred combinations include polyvinylidene fluoride and alumina grains.

In the lithium ion secondary battery according to the present invention, the electrode assembly is sealed in the outer package together with the electrolyte. As the electrolyte, a nonaqueous electrolyte can be used. As a solvent for the nonaqueous electrolyte, a solvent at least containing carbonate is preferable. Such carbonate may be cyclic carbonates and/or chain carbonates. Although not particularly limited, examples of the cyclic carbonates can include at least one selected from the group consisting of propylene carbonate (PC), ethylene carbonate (EC), butylene carbonate (BC), and vinylene carbonate (VC). Examples of the chain carbonates can include at least one selected from the group consisting of dimethyl carbonate (DMC), diethyl carbonate (DEC), ethyl methyl carbonate (EMC), and dipropyl carbonate (DPC). Although it is a mere example, a combination of cyclic carbonates and chain carbonates may be used as the nonaqueous electrolyte, and for example, a mixture of ethylene carbonate and diethyl carbonate is used. Further, as a solute of the nonaqueous electrolyte, for example, a Li salt such as $LiPF_6$ and/or $LiBF_4$ is preferably used.

The outer package used in the present invention is an outer package made of a laminate film. As the laminate film, a film obtained by stacking a metal foil and a polymer film is preferable, and examples can include a three-layer structure including an outer polymer film/a metal foil/an inner polymer film. The outer polymer film is to prevent damage to the metal foil due to permeation and contact of moisture and the like, and polymers such as polyethylene terephthalate (PET) and nylon can be used. Further, the metal foil prevents permeation of moisture and gas, and a foil of copper, aluminum, stainless steel or the like can be used. Further, the inner polymer film is to protect the metal foil from the electrolyte housed therein and to perform melting and sealing at the time of heat sealing, and polyolefin, acidic polyolefin or the like can be used. The thickness of the laminate film is not particularly limited, but is 10 μm to 1 mm, preferably 50 μm to 150 μm.

(Manufacture Method)

The lithium ion secondary battery of the present invention can be manufactured, for example, by using the following manufacture method. That is, a manufacture method according to another aspect of the present invention includes producing an electrode assembly having a plate-shaped positive electrode and a plate-shaped negative electrode stacked with a separator interposed therebetween; housing the electrode assembly in an outer package made of a laminate film; injecting an electrolyte into the outer package housing the electrode assembly; sealing the outer package into which the electrolyte has been injected under reduced pressure; heat-pressing the sealed outer package at 60° C. or higher and lower than 100° C.; and initially charging the lithium ion secondary battery at a temperature of 25° C. or higher and lower than 100° C.

When producing the electrode assembly, the plate-shaped positive electrode and the plate-shaped negative electrode are stacked with the separator interposed therebetween. The positive electrode can be produced, for example, by applying a positive electrode mixture slurry containing a positive electrode active material and a binder to both surfaces or one surface of a positive electrode current collector. Further, the negative electrode can be produced, for example, by applying a negative electrode mixture slurry containing a negative electrode active material and a binder to both surfaces or one surface of a negative electrode current collector.

When housing the electrode assembly in an outer package, a band-shaped laminate film is molded into a shape of the electrode assembly, and then the electrode assembly is inserted into the molded portion and the laminate film is folded and ready to be sealed.

A portion other than an injection port of the outer package is sealed, and the electrolyte is injected through the injection port. As the amount of electrolyte to be injected, the amount of electrolyte per battery capacitance (Ah) of the lithium ion secondary battery to be produced can be used. From the viewpoint of cycle characteristics, the amount per battery capacitance is 1.3 to 1.7 g/Ah, preferably 1.4 to 1.6 g/Ah.

After the injection, the injection port is sealed under reduced pressure. The reduced pressure is 5 and 80 kPa, preferably 5 and 50 kPa.

Next, the outer package having the injection port sealed is heat pressed. The temperature during heat pressing is 60° C. or more and less than 100° C., preferably 60 to 90° C.

Further, the pressing pressure is 0.1 MPa to 5.0 MPa, preferably 0.5 MPa to 2.5 MPa. The heat pressing may be after the initial charge step, an aging step, and a stabilizing step.

Next, the initial charge is performed after heat pressing. The temperature during initial charge is 25° C. or more and less than 100° C., preferably 25 to 90° C.

Further, an aging step and/or a stabilizing step may be performed as necessary. The aging step entails subjection of the lithium ion secondary battery to a temperature of 25 to 80° C. for 0.1 to 500 hours. Further, in the stabilizing step, the characteristics of the battery are stabilized by repeating charge and discharge at a temperature of 15 to 35° C.

EXAMPLE

The present invention will be further described with reference to the following example, but the present invention is not limited to the following example. Note that in the following example, a lithium ion secondary battery may be abbreviated as a battery.

(Manufacture of the Positive Electrode)

As the positive electrode active material, lithium cobalt oxide (LCO1) indicated in Table 1 was used. 97.5% by weight of LCO1, 1.0% by weight of carbon nanotube having an average grain diameter of 5 nm and an average chain length of 200 μm as a conductive aid, and 1.5% by weight of polyvinylidene fluoride as a binder were used. These were mixed with NMP to obtain a positive electrode mixture slurry. Next, the positive electrode mixture slurry was uniformly applied to an aluminum foil and the resultant was rolled by a roll press to obtain a double-sided positive electrode having a positive electrode active material layer on both surfaces and a single-sided positive electrode having a positive electrode active material layer on one surface. The thickness of the aluminum foil was 12 μm for the double-sided positive electrode and 20 μm for the single-sided positive electrode. The basis weight (per one side) of the positive electrode active material layer of the positive electrode was 18.4 mg/cm$^2$, and the density was 4.10 g/cm$^3$ for the double-sided positive electrode and 3.80 g/cm$^3$ for the single-sided positive electrode.

TABLE 1

| POSITIVE ELECTRODE ACTIVE MATERIAL | DOPING ELEMENT: AMOUNT OF DOPE | D50 (μm) | SPECIFIC SURFACE AREA (m$^2$/g) |
|---|---|---|---|
| LCO1 | Mg: 1 PART BY WEIGHT Zr: 0.05 PARTS BY WEIGHT | 17 | 0.2 |

(Manufacture of the Negative Electrode)

Artificial graphite (AG1) indicated in Table 2 was used as the negative electrode active material. 97.0% by weight of AG1, 2.0% by weight of styrene-butadiene rubber as a binder, and 1.0% by weight of carboxymethylcellulose as a thickener were used. These were mixed with water to obtain a negative electrode mixture slurry. Next, the negative electrode mixture slurry was uniformly applied to a copper foil having a thickness 6 μm and the resultant was rolled with a roll press to obtain a double-sided negative electrode having a negative electrode active material layer on both surfaces. The basis weight (per one side) of the negative electrode active material layer of the negative electrode was 19.6 g/cm$^2$, and the density was 1.70 g/cm$^3$.

TABLE 2

| NEGATIVE ELECTRODE ACTIVE MATERIAL | TYPE OF GRAPHITE | D50 (μm) | SPECIFIC SURFACE AREA (m$^2$/g) | REVERSIBLE CAPACITANCE (mAh/g) |
|---|---|---|---|---|
| AG1 | ARTIFICIAL GRAPHITE | 14 | 2.0 | 350 |

(Manufacture of the Electrolyte)

LiPF$_6$ was dissolved in 98 parts by volume of ethylene carbonate and diethyl carbonate in a volume ratio of 3:7 so that the concentration in the electrolyte was 1 mol/L, and 2 parts by volume of vinylene carbonate was mixed to obtain the electrolyte.

(Manufacture of the Battery)

<Step of Producing the Electrode Assembly and Step of Housing the Electrode Assembly in the Outer Package>

The manufactured double-sided positive electrode (length 90 mm), the two manufactured single-sided positive electrodes (length 90 mm), and the manufactured double-sided negative electrode (length 91 mm) were made into the structure illustrated in FIG. 1 with a separator interposed therebetween to produce the electrode assembly, which was sealed together with the electrolyte in the outer package made of a laminate film to manufacture a lithium ion secondary battery. The positive electrode and the negative electrode were alternately arranged with a separator interposed therebetween, and a single-sided positive electrode was used as the uppermost layer electrode and the lowermost layer electrode. The single-sided positive electrode was arranged such that the positive electrode active material layer faced the negative electrode active material layer of the negative electrode with the separator interposed therebetween. "Number of positive electrodes" (=number of double-sided positive electrodes+number of single-sided positive electrodes) and "number of negative electrodes" are as indicated in Tables 3 to 7. The width of the double-sided positive electrode and the single-sided positive electrode was determined by using "battery width B" indicated in Tables 3 to 7 and was a value obtained by subtracting 2 mm from the battery width B. Further, the width of the double-sided negative electrode was a value obtained by subtracting 1 mm from the battery width B. External terminals were provided on the positive electrode and the negative electrode, and were led out of the outer package. As the separator, a separator 1 having a thickness of 9 μm including a microporous polyethylene film and an adhesive layer made of polyvinylidene fluoride and alumina grains on both surfaces, or a separator 2 having a thickness of 9 μm made of a microporous polyethylene film was used. "Type of separator" used was as indicated in Tables 3 to 7.

<Injection Step>

The stack body was inserted into a laminate outer package, the sides other than the injection port were sealed, and then the electrolyte was injected. The injection was performed in a dry room at a dew point of −50° C. The amount of electrolyte injected was determined by adding volatile content (0.10 g) to the "amount of electrolyte" (g/Ah) indicated in Tables 3 to 7. "Amount of electrolyte" (g/Ah) was calculated from the weight of electrolyte (g) and the initial capacitance (Ah) of the battery.

<Vacuum Sealing Step>

Vacuum sealing was performed on a cell into which the electrolyte was injected. Vacuum sealing was performed by placing the cell after injection under reduced pressure and sealing the injection port. "Pressure at sealing" is as indicated in Tables 3 to 7.

<Heat Pressing Step>

Heat pressing was performed on a part of the cell after the sealing step. The heat pressing was performed by sandwiching the cell between two, heater-equipped metal plates set at "heat pressing temperatures" indicated in Tables 3 to 7 and performing pressing for 10 minutes at a pressure of 1.6 MPa. In Tables 3 to 7, heat pressing was not performed on cells for which "heat pressing temperatures" was "none."

<Initial Charge Step>

Initial charge was performed on the heat-pressed cell. Initial charge was performed by sandwiching the cell between two, heater-equipped metal plates set at "initial charge temperatures" indicated in Tables 3 to 7, while applying a pressure of 1.0 MPa, performing constant current charge until the voltage reaches 4.0 V at 0.5 C, and then performing constant voltage charge at the voltage value for 30 minutes.

<Aging Step>

In the aging step, aging treatment was performed at 60° C. for 24 hours.

<Stabilizing Step>

The charge and discharge were repeated in a constant temperature bath at 25° C. to stabilize the battery.

The charge was performed as constant current charge at a current value of 0.5 C up to a voltage of 4.40 V, followed by constant voltage charge for one hour at a voltage of 4.40 V. The discharge was stopped for 10 minutes after the completion of the charge, and constant current discharge was performed at a current value of 0.2 C up to a voltage of 3.0 V. The capacitance at the time of the constant current discharge was measured as "initial capacitance." After the discharge, there was a 10 minute pause.

(Measurement of the Three-Point Bending Strength)

The three-point bending strength was measured using the manufactured battery. The three-point bending strength was measured using an autograph (AG-X) manufactured by Shimadzu Corporation and a plastic three-point bending test jig (kit number: 346-53888) manufactured by Shimadzu Corporation according to a three-point bending test specified by JIS K7171: 2016 (plastics-determination of flexural properties). The thickness A (mm) of the battery was determined by measuring the thickness near the middle of the cell using a Mitutoyo micrometer (MDC-25MX) and rounding off to the third decimal place. The battery width B (mm) was a value obtained by reading the length of the part of the battery after the three-point bending test pressed by the cylinder of the three-point bending test jig in units of 1 mm using a Shinwa straight scale (JIS first class).

(Cycle Test)

A cycle test was performed in a 25° C. constant temperature bath using another battery produced under the same conditions as the battery on which the three-point bending test was performed. The charge was performed as constant current charge at a current value of 1.0 C up to a voltage of 4.40 V, followed by constant voltage charge for one hour at a voltage of 4.40 V. After completion of the discharge and 10 minutes pause, constant current discharge was performed at a current value of 1.0 C up to a voltage of 3.0 V, and there was a 10 minutes pause after the discharge. This charge/discharge cycle was repeated for 500 cycles. Thereafter, (501st) charge/discharge was performed under the conditions described below, and the discharge capacitance at the time of constant current discharge was defined as "cell capacitance after cycle."

Charge: After constant current charge at a current value of 0.5 C up to a voltage of 4.40 V, constant voltage charge was performed for one hour at a voltage of 4.40 V; and Discharge: After charge was completed and a 10 minutes pause, constant current discharge was performed at a current value of 0.2 C up to a voltage of 3.0 V.

The ratio of "cell capacitance after cycle" to "initial capacitance" was calculated as "capacitance maintenance rate."

"Capacitance maintenance rate" was evaluated according to the following criteria.

⊚: 90% or more (best):
○: 85% or more (good):
Δ: 80% or more (pass (no problem in practical use)):
x: Less than 80% (bad (practically problematic)).

TABLE 3

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSURE TEMPERATURE (° C.) |
|---|---|---|---|---|---|---|
| COMPARATIVE EXAMPLE 1-1 | 12 | 11 | SEPARATOR 2 | 1.5 | 10 | NONE |
| COMPARATIVE EXAMPLE 1-2 | 12 | 11 | SEPARATOR 2 | 1.5 | 10 | 80 |
| COMPARATIVE EXAMPLE 1-3 | 12 | 11 | SEPARATOR 2 | 1.5 | 10 | NONE |
| COMPARATIVE EXAMPLE 14 | 12 | 11 | SEPARATOR 2 | 1.5 | 10 | 80 |
| COMPARATIVE EXAMPLE 1-5 | 12 | 11 | SEPARATOR 1 | 1.5 | 10 | NONE |
| EXAMPLE 1-1 | 12 | 11 | SEPARATOR 1 | 1.5 | 10 | 80 |
| EXAMPLE 1-2 | 12 | 11 | SEPARATOR 1 | 1.5 | 10 | NONE |
| EXAMPLE 1-2 | 12 | 11 | SEPARATOR 1 | 1.5 | 10 | 80 |

| | INITIAL CHARGE TEMPERATURE (° C.) | BATTERY THICKNESS A (mm) | BATTERY WIDTH B (mm) | THREE-POINT BENDING STRENGTH C (N) | C/(A × B) (N/mm2) | CAPACITANCE MAINTENANCE RATE (%) |
|---|---|---|---|---|---|---|
| COMPARATIVE EXAMPLE 1-1 | 25 | 3 | 36 | 20 | 0.19 | 54 X |
| COMPARATIVE EXAMPLE 1-2 | 25 | 3 | 36 | 22 | 0.2 | 52 X |
| COMPARATIVE EXAMPLE 1-3 | 80 | 3 | 36 | 23 | 0.21 | 53 X |
| COMPARATIVE EXAMPLE 14 | 80 | 3 | 36 | 26 | 0.24 | 50 X |
| COMPARATIVE EXAMPLE 1-5 | 25 | 3 | 36 | 33 | 0.31 | 59 X |
| EXAMPLE 1-1 | 25 | 3 | 36 | 54 | 0.5 | 80 Δ |
| EXAMPLE 1-2 | 80 | 3 | 36 | 92 | 0.85 | 92 ⊚ |
| EXAMPLE 1-2 | 80 | 3 | 36 | 119 | 1.1 | 85 ○ |

TABLE 4

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSING TEMPERATURE (° C.) |
|---|---|---|---|---|---|---|
| COMPARATIVE EXAMPLE 2-1 | 12 | 11 | SEPARATOR 1 | 1.2 | 10 | NONE |
| EXAMPLE 2-1 | 12 | 11 | SEPARATOR 1 | 1.4 | 10 | NONE |
| EXAMPLE 2-2 | 12 | 11 | SEPARATOR 1 | 1.5 | 10 | NONE |
| EXAMPLE 2-3 | 12 | 11 | SEPARATOR 1 | 1.6 | 10 | NONE |
| COMPARATIVE EXAMPLE 2-2 | 12 | 11 | SEPARATOR 1 | 1.8 | 10 | NONE |
| COMPARATIVE EXAMPLE 3-1 | 12 | 11 | SEPARATOR 1 | 1.5 | 1 | CELL COULD NOT BE PRODUCED DUE TO SPILLING OF ELECTROLYTE DURING SEALING |
| EXAMPLE 3-1 | 12 | 11 | SEPARATOR 1 | 1.5 | 5 | NONE |
| EXAMPLE 3-2 | 12 | 11 | SEPARATOR 1 | 1.5 | 10 | NONE |
| EXAMPLE 3-3 | 12 | 11 | SEPARATOR 1 | 1.5 | 50 | NONE |
| COMPARATIVE EXAMPLE 3-2 | 12 | 11 | SEPARATOR 1 | 1.5 | 100 | NONE |

| | INITIAL CHARGE TEMPERATURE (° C.) | BATTERY THICKNESS A (mm) | BATTERY WIDTH B (mm) | THREE-POINT BENDING STRENGTH C (N) | C/(A × B) (N/mm2) | CAPACITANCE MAINTENANCE RATE (%) |
|---|---|---|---|---|---|---|
| COMPARATIVE EXAMPLE 2-1 | 80 | 3 | 36 | 137 | 1.27 | 60 X |
| EXAMPLE 2-1 | 80 | 3 | 36 | 97 | 0.9 | 91 ⊚ |
| EXAMPLE 2-2 | 80 | 3 | 36 | 92 | 0.85 | 92 ⊚ |
| EXAMPLE 2-3 | 80 | 3 | 36 | 78 | 0.72 | 91 ⊚ |
| COMPARATIVE EXAMPLE 2-2 | 80 | 3 | 36 | 45 | 0.42 | 68 X |
| COMPARATIVE EXAMPLE 3-1 | CELL COULD NOT BE PRODUCED DUE TO SPILLING OF ELECTROLYTE DURING SEALING | | | | | |
| EXAMPLE 3-1 | 80 | 3 | 36 | 115 | 1.06 | 88 ○ |
| EXAMPLE 3-2 | 80 | 3 | 36 | 92 | 0.85 | 92 ⊚ |
| EXAMPLE 3-3 | 80 | 3 | 36 | 87 | 0.81 | 91 ⊚ |
| COMPARATIVE EXAMPLE 3-2 | 80 | 3 | 36 | 36 | 0.33 | 71 X |

TABLE 5

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSING TEMPERATURE (° C.) |
|---|---|---|---|---|---|---|
| COMPARATIVE EXAMPLE 4-1 | 12 | 11 | SEPARATOR 1 | 1.5 | 10 | NONE |
| COMPARATIVE EXAMPLE 4-2 | 12 | 11 | SEPARATOR 1 | 1.5 | 10 | 60 |
| EXAMPLE 4-1 | 12 | 11 | SEPARATOR 1 | 1.5 | 10 | 80 |
| EXAMPLE 4-2 | 12 | 11 | SEPARATOR 1 | 1.5 | 10 | 90 |
| COMPARATIVE EXAMPLE 4-3 | 12 | 11 | SEPARATOR 1 | 1.5 | 10 | 100 |
| COMPARATIVE EXAMPLE 5-1 | 12 | 11 | SEPARATOR 1 | 1.5 | 10 | NONE |
| COMPARATIVE EXAMPLE 5-2 | 12 | 11 | SEPARATOR 1 | 1.5 | 10 | 60 |
| EXAMPLE 5-1 | 12 | 11 | SEPARATOR 1 | 1.5 | 10 | 80 |
| EXAMPLE 5-2 | 12 | 11 | SEPARATOR 1 | 1.5 | 10 | 90 |
| COMPARATIVE EXAMPLE 5-3 | 12 | 11 | SEPARATOR 1 | 1.5 | 10 | 100 |
| EXAMPLE 6-1 | 12 | 11 | SEPARATOR 1 | 1.5 | 10 | NONE |
| EXAMPLE 6-2 | 12 | 11 | SEPARATOR 1 | 1.5 | 10 | 60 |
| EXAMPLE 6-3 | 12 | 11 | SEPARATOR 1 | 1.5 | 10 | 80 |
| EXAMPLE 6-4 | 12 | 11 | SEPARATOR 1 | 1.5 | 10 | 90 |
| COMPARATIVE EXAMPLE 6-1 | 12 | 11 | SEPARATOR 1 | 1.5 | 10 | 100 |
| EXAMPLE 7-1 | 12 | 11 | SEPARATOR 1 | 1.5 | 10 | NONE |
| EXAMPLE 7-2 | 12 | 11 | SEPARATOR 1 | 1.5 | 10 | 60 |
| EXAMPLE 7-3 | 12 | 11 | SEPARATOR 1 | 1.5 | 10 | 80 |
| COMPARATIVE EXAMPLE 7-1 | 12 | 11 | SEPARATOR 1 | 1.5 | 10 | 90 |

TABLE 5-continued

| | | | | | | |
|---|---|---|---|---|---|---|
| COMPARATIVE EXAMPLE 7-2 | 12 | 11 | SEPARATOR 1 | 1.5 | 10 | 100 |
| COMPARATIVE EXAMPLE 8-1 | 12 | 11 | SEPARATOR 1 | 1.5 | 10 | NONE |
| COMPARATIVE EXAMPLE 8-2 | 12 | 11 | SEPARATOR 1 | 1.5 | 10 | 60 |
| COMPARATIVE EXAMPLE 8-3 | 12 | 11 | SEPARATOR 1 | 1.5 | 10 | 80 |
| COMPARATIVE EXAMPLE 8-4 | 12 | 11 | SEPARATOR 1 | 1.5 | 10 | 90 |
| COMPARATIVE EXAMPLE 8-5 | 12 | 11 | SEPARATOR 1 | 1.5 | 10 | 100 |

| | INITIAL CHARGE TEMPERATURE (° C.) | BATTERY THICKNESS A (mm) | BATTERY WIDTH B (mm) | THREE-POINT BENDING STRENGTH C (N) | C/(A × B) (N/mm2) | CAPACITANCE MAINTENANCE RATE (%) |
|---|---|---|---|---|---|---|
| COMPARATIVE EXAMPLE 4-1 | 25 | 3 | 36 | 33 | 0.31 | 59 X |
| COMPARATIVE EXAMPLE 4-2 | 25 | 3 | 36 | 39 | 0.36 | 72 X |
| EXAMPLE 4-1 | 25 | 3 | 36 | 54 | 0.5 | 80 Δ |
| EXAMPLE 4-2 | 25 | 3 | 36 | 84 | 0.78 | 90 ⊚ |
| COMPARATIVE EXAMPLE 4-3 | 25 | 3 | 36 | 179 | 1.66 | 54 X |
| COMPARATIVE EXAMPLE 5-1 | 60 | 3 | 36 | 41 | 0.38 | 62 X |
| COMPARATIVE EXAMPLE 5-2 | 60 | 3 | 36 | 48 | 0.44 | 76 X |
| EXAMPLE 5-1 | 60 | 3 | 36 | 66 | 0.61 | 87 ○ |
| EXAMPLE 5-2 | 60 | 3 | 36 | 95 | 0.88 | 90 ⊚ |
| COMPARATIVE EXAMPLE 5-3 | 60 | 3 | 36 | 182 | 1.69 | 53 X |
| EXAMPLE 6-1 | 80 | 3 | 36 | 92 | 0.85 | 92 ⊚ |
| EXAMPLE 6-2 | 80 | 3 | 36 | 100 | 0.93 | 91 ⊚ |
| EXAMPLE 6-3 | 80 | 3 | 36 | 119 | 1.1 | 85 ○ |
| EXAMPLE 6-4 | 80 | 3 | 36 | 130 | 1.2 | 80 Δ |
| COMPARATIVE EXAMPLE 6-1 | 80 | 3 | 36 | 201 | 1.86 | 50 X |
| EXAMPLE 7-1 | 90 | 3 | 36 | 103 | 0.95 | 91 ⊚ |
| EXAMPLE 7-2 | 90 | 3 | 36 | 111 | 1.03 | 89 ○ |
| EXAMPLE 7-3 | 90 | 3 | 36 | 128 | 1.19 | 82 Δ |
| COMPARATIVE EXAMPLE 7-1 | 90 | 3 | 36 | 159 | 1.47 | 61 X |
| COMPARATIVE EXAMPLE 7-2 | 90 | 3 | 36 | 232 | 2.15 | 46 X |
| COMPARATIVE EXAMPLE 8-1 | 100 | 3 | 36 | 194 | 1.8 | 54 X |
| COMPARATIVE EXAMPLE 8-2 | 100 | 3 | 36 | 206 | 1.91 | 52 X |
| COMPARATIVE EXAMPLE 8-3 | 100 | 3 | 36 | 214 | 1.98 | 51 X |
| COMPARATIVE EXAMPLE 8-4 | 100 | 3 | 36 | 241 | 2.23 | 48 X |
| COMPARATIVE EXAMPLE 8-5 | 100 | 3 | 36 | 265 | 2.45 | 43 X |

TABLE 6

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSING TEMPERATURE (° C.) |
|---|---|---|---|---|---|---|
| COMPARATIVE EXAMPLE 9-1 | 2 | 1 | SEPARATOR 1 | 1.5 | 10 | NONE |
| EXAMPLE 9-1 | 2 | 1 | SEPARATOR 1 | 1.5 | 10 | NONE |
| COMPARATIVE EXAMPLE 9-2 | 4 | 3 | SEPARATOR 1 | 1.5 | 10 | NONE |
| EXAMPLE 9-2 | 4 | 3 | SEPARATOR 1 | 1.5 | 10 | NONE |
| COMPARATIVE EXAMPLE 9-3 | 8 | 7 | SEPARATOR 1 | 1.5 | 10 | NONE |
| EXAMPLE 9-3 | 8 | 7 | SEPARATOR 1 | 1.5 | 10 | NONE |

TABLE 6-continued

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSING TEMPERATURE (° C.) |
|---|---|---|---|---|---|---|
| COMPARATIVE EXAMPLE 94 | 12 | 11 | SEPARATOR 1 | 1.5 | 10 | NONE |
| EXAMPLE 94 | 12 | 11 | SEPARATOR 1 | 1.5 | 10 | NONE |
| COMPARATIVE EXAMPLE 9-5 | 16 | 15 | SEPARATOR 1 | 1.5 | 10 | NONE |
| EXAMPLE 9-5 | 16 | 15 | SEPARATOR 1 | 1.5 | 10 | NONE |

| | INITIAL CHARGE TEMPERATURE (° C.) | BATTERY THICKNESS A (mm) | BATTERY WIDTH B (mm) | THREE-POINT BENDING STRENGTH C (N) | C/(A × B) (N/mm2) | CAPACITANCE MAINTENANCE RATE (%) |
|---|---|---|---|---|---|---|
| COMPARATIVE EXAMPLE 9-1 | 25 | 0.45 | 36 | 7 | 0.43 | 62 X |
| EXAMPLE 9-1 | 80 | 0.45 | 36 | 15 | 0.93 | 90 ⊚ |
| COMPARATIVE EXAMPLE 9-2 | 25 | 0.94 | 36 | 13 | 0.38 | 60 X |
| EXAMPLE 9-2 | 80 | 0.94 | 36 | 32 | 0.95 | 90 ⊚ |
| COMPARATIVE EXAMPLE 9-3 | 25 | 1.96 | 36 | 23 | 0.33 | 58 X |
| EXAMPLE 9-3 | 80 | 1.96 | 36 | 63 | 0.89 | 93 ⊚ |
| COMPARATIVE EXAMPLE 94 | 25 | 3 | 36 | 33 | 0.31 | 59 X |
| EXAMPLE 94 | 80 | 3 | 36 | 92 | 0.85 | 92 ⊚ |
| COMPARATIVE EXAMPLE 9-5 | 25 | 4.01 | 36 | 42 | 0.29 | 59 X |
| EXAMPLE 9-5 | 80 | 4.01 | 36 | 124 | 0.86 | 91 ⊚ |

TABLE 7

| | NUMBER OF POSITIVE ELECTRODES | NUMBER OF NEGATIVE ELECTRODES | TYPE OF SEPARATOR | AMOUNT OF ELECTROLYTE (g/Ah) | PRESSURE DURING SEALING (kPa) | HEAT PRESSING TEMPERATURE (° C.) |
|---|---|---|---|---|---|---|
| COMPARATIVE EXAMPLE 10-1 | 12 | 11 | SEPARATOR 1 | 1.5 | 10 | NONE |
| EXAMPLE 10-1 | 12 | 11 | SEPARATOR 1 | 1.5 | 10 | NONE |
| COMPARATIVE EXAMPLE 10-2 | 12 | 11 | SEPARATOR 1 | 1.5 | 10 | NONE |
| EXAMPLE 10-2 | 12 | 11 | SEPARATOR 1 | 1.5 | 10 | NONE |
| COMPARATIVE EXAMPLE 10-3 | 12 | 11 | SEPARATOR 1 | 1.5 | 10 | NONE |
| EXAMPLE 10-3 | 12 | 11 | SEPARATOR 1 | 1.5 | 10 | NONE |
| COMPARATIVE EXAMPLE 104 | 12 | 11 | SEPARATOR 1 | 1.5 | 10 | NONE |
| EXAMPLE 104 | 12 | 11 | SEPARATOR 1 | 1.5 | 10 | NONE |
| COMPARATIVE EXAMPLE 10-5 | 12 | 11 | SEPARATOR 1 | 1.5 | 10 | NONE |
| EXAMPLE 10-5 | 12 | 11 | SEPARATOR 1 | 1.5 | 10 | NONE |

| | INITIAL CHARGE TEMPERATURE (° C.) | BATTERY THICKNESS A (mm) | BATTERY WIDTH B (mm) | THREE-POINT BENDING STRENGTH C (N) | C/(A × B) (N/mm2) | CAPACITANCE MAINTENANCE RATE (%) |
|---|---|---|---|---|---|---|
| COMPARATIVE EXAMPLE 10-1 | 25 | 3 | 16 | 17 | 0.35 | 57 X |
| EXAMPLE 10-1 | 80 | 3 | 16 | 40 | 0.83 | 91 ⊚ |
| COMPARATIVE EXAMPLE 10-2 | 25 | 3 | 26 | 25 | 0.32 | 57 X |
| EXAMPLE 10-2 | 80 | 3 | 26 | 67 | 0.86 | 92 ⊚ |
| COMPARATIVE EXAMPLE 10-3 | 25 | 3 | 36 | 33 | 0.31 | 59 X |
| EXAMPLE 10-3 | 80 | 3 | 36 | 92 | 0.85 | 92 ⊚ |
| COMPARATIVE EXAMPLE 104 | 25 | 3 | 46 | 50 | 0.36 | 59 X |
| EXAMPLE 104 | 80 | 3 | 46 | 116 | 0.84 | 91 ⊚ |
| COMPARATIVE EXAMPLE 10-5 | 25 | 3 | 56 | 59 | 0.35 | 58 X |
| EXAMPLE 10-5 | 80 | 3 | 56 | 143 | 0.85 | 90 ⊚ |

(Results)

The battery in which C/(A×B) is 0.50 (N/mm²) to 1.20 (N/mm²) had a capacitance retention rate of 80% or more, and excellent cycle characteristics were obtained.

Further, as indicated in Table 3, when the separator having the adhesive layer was used, the cycle characteristics were improved as compared with the case where the separator having no adhesive layer was used. Further, by using a separator having an adhesive layer and further performing heat pressing and/or initial charge, a capacitance retention rate of 80% or more was obtained.

Table 4 studies the effects of the amount of the electrolyte and the sealing pressure after the injection of the electrolyte. When the amount of the electrolyte was 1.4, 1.5, or 1.6 (g/Ah), a capacitance retention rate of 80% or more was obtained.

Further, when the sealing pressure after the injection of the electrolyte was lower than 100 kPa, a capacitance retention rate of 80% or more was obtained.

Table 5 studies the effects of heat pressing temperature and initial charge temperature. When performing both heat pressing and initial charge, when the heat pressing temperature was 60° C. or higher and lower than 100° C. and the initial charge temperature was 25° C. or higher and lower than 100° C., a capacitance retention rate of 80% or higher was obtained.

Table 6 studies the effect of battery thickness. A capacitance retention rate of 80% or more was obtained when the thickness was in the range of 0.45 to 4.01 mm.

Table 7 studies the effect of battery width. A capacitance retention rate of 80% or more was obtained in the width range of 16 to 56 mm.

According to the present invention, since the cycle characteristics of the lithium ion secondary battery in which the stack-type electrode assembly is housed in the outer package made of a laminate film can be further improved, use for various uses can be possible. For example, it can be used in electric/information/communication fields where mobile devices are used (e.g., mobile device fields such as mobile phones, smartphones, notebook computers, digital cameras, activity meters, arm computers and electronic paper), home and small industrial applications (e.g., electric tools, golf carts, home/care/industrial robots), large industrial applications (e.g., fields of forklifts, elevators, bay harbor cranes), transportation system fields (e.g., fields of hybrid vehicles, electric vehicles, buses, trains, electric assist bicycles, electric motorcycles), power system applications (e.g., fields of various types of power generation, road conditioners, smart grids, general home-installed power storage systems), medical applications (medical device fields, e.g., earphone hearing aids), medical applications (fields such as dose management systems), IoT fields, space and deep sea applications (e.g., fields of spacecrafts, submersible research vessels) and the like.

DESCRIPTION OF REFERENCE SYMBOLS

10: Electrode assembly
11a: Double-sided positive electrode
11b: Single-sided positive electrode
12a: Double-sided negative electrode
14: Separator
20: Lithium ion secondary battery
21: Outer package
21a: Top surface
21b: Bottom surface
21c: Sealing portion
21d: Long side
21e: Long side
21f: Short side
21g: Short side
22: External terminal
23: External terminal
30: Lithium ion secondary battery
31: Outer package
31a: Top surface
31c: Sealing portion
31d: Side
31e: Side
31f: Side
31g: Side
31h: Side
31i: Side
32: First extension
32a: Top surface of first extension
33: Second extension
33a: Top surface of second extension
50: Support base
51: Support base
52: Indenter

The invention claimed is:

1. A lithium ion secondary battery comprising:
an electrode assembly having a plate-shaped positive electrode and a plate-shaped negative electrode stacked with a separator interposed therebetween; and
an outer package made of a laminate film housing the electrode assembly,
wherein the lithium ion secondary battery has a polygonal shape having at least one set of a width and a length in a plan view thereof, and C/(A×B) is 0.50 (N/mm²) to 1.20 (N/mm²), where A is a thickness of the lithium ion secondary battery, B is the width of the lithium ion secondary battery, and C is a three-point bending strength of the lithium ion secondary battery.

2. The lithium ion secondary battery according to claim 1, wherein C/(A×B) is 0.60 (N/mm²) to 1.10 (N/mm²).

3. The lithium ion secondary battery according to claim 1, wherein C/(A×B) is 0.70 (N/mm²) to 1.00 (N/mm²).

4. The lithium ion secondary battery according to claim 1, wherein the lithium ion secondary battery has a rectangular shape in the plan view thereof.

5. The lithium ion secondary battery according to claim 1, wherein the lithium ion secondary battery has an L-shape having two sets of widths and lengths in the plan view thereof, and C/(A×B2) is 0.50 (N/mm²) to 1.20 (N/mm²), where B is the width of a first of the two sets of widths and lengths of the lithium ion secondary battery, and B2 is a width a second of the two sets of widths and lengths of the lithium ion secondary battery.

6. The lithium ion secondary battery according to claim 5, wherein C/(A×B) is 0.60 (N/mm²) to 1.10 (N/mm²) and C/(A×B2) is 0.60 (N/mm²) to 1.10 (N/mm²).

7. The lithium ion secondary battery according to claim 5, wherein C/(A×B) is 0.70 (N/mm²) to 1.00 (N/mm²) and C/(A×B2) is 0.70 (N/mm²) to 1.00 (N/mm²).

8. The lithium ion secondary battery according to claim 1, wherein the separator has an adhesive layer at least on one surface thereof.

9. The lithium ion secondary battery according to claim 1, wherein the A is 0.45 mm or more.

10. The lithium ion secondary battery according to claim 1, wherein the A is 0.45 mm to 5.00 mm.

11. A method of manufacturing a lithium ion secondary battery, the method comprising:

housing having a plate-shaped positive electrode and a plate-shaped negative electrode stacked with a separator interposed therebetween in an outer package made of a laminate film;

injecting an electrolyte into the outer package housing the electrode assembly;

sealing the outer package into which the electrolyte has been injected under reduced pressure;

heat pressing the sealed outer package at 60° C. or higher and lower than 100° C.;

and initially charging the lithium ion secondary battery at a temperature of 25° C. or higher and lower than 100° C.;

wherein the lithium ion secondary battery has a polygonal shape having at least one set of a width and a length in a plan view thereof, and C/(A×B) is 0.50 (N/mm$^2$) to 1.20 (N/mm$^2$), where A is a thickness of the lithium ion secondary battery, B is the width of the lithium ion secondary battery, and C is a three-point bending strength of the lithium ion secondary battery.

12. The method according to claim 11, wherein the separator has an adhesive layer at least on one surface.

13. The method according to claim 11, wherein the electrolyte is injected such that an amount per battery capacitance is 1.3 to 1.7 g/Ah.

14. The method according to claim 11, wherein C/(A×B) is 0.60 (N/mm$^2$) to 1.10 (N/mm$^2$).

15. will now read: The method according to claim 11, wherein C/(A×B) is 0.70 (N/mm$^2$) to 1.00 (N/mm$^2$).

16. The method according to claim 11, wherein the lithium ion secondary battery has a rectangular shape in the plan view thereof.

17. The method according to claim 11, wherein the lithium ion secondary battery has an L-shape having two sets of widths and lengths in the plan view thereof, and C/(A×B2) is 0.50 (N/mm$^2$) to 1.20 (N/mm$^2$), where B is the width of a first of the two sets of widths and lengths of the lithium ion secondary battery, and B2 is a width a second of the two sets of widths and lengths of the lithium ion secondary battery.

18. The method according to claim 17, wherein C/(A×B) is 0.60 (N/mm$^2$) to 1.10 (N/mm$^2$) and C/(A×B2) is 0.60 (N/mm$^2$) to 1.10 (N/mm$^2$).

19. The method according to claim 17, wherein C/(A×B) is 0.70 (N/mm$^2$) to 1.00 (N/mm$^2$) and C/(A×B2) is 0.70 (N/mm$^2$) to 1.00 (N/mm$^2$).

* * * * *